United States Patent [19]

Schumacher

[11] 4,186,995
[45] Feb. 5, 1980

[54] LIGHT DEVICE, LENS, AND FIBER OPTIC PACKAGE

[75] Inventor: William L. Schumacher, Camp Hill, Pa.

[73] Assignee: AMP Incorporated, Harrisburg, Pa.

[21] Appl. No.: 891,793

[22] Filed: Mar. 30, 1978

[51] Int. Cl.² ............................................. G02B 5/14
[52] U.S. Cl. ................................ 350/96.20; 250/227; 250/239; 350/96.18
[58] Field of Search ............... 350/96.18, 96.20, 96.21, 350/96.22; 250/227, 239, 551, 552

[56] References Cited

U.S. PATENT DOCUMENTS

| B 522,577 | 6/1976 | Goell et al. | 350/96.15 |
|---|---|---|---|
| 3,510,641 | 5/1970 | Reynolds | 350/96.20 |
| 3,569,933 | 3/1971 | Longenecker et al. | 350/96.20 |
| 3,582,637 | 6/1971 | Cecil | 350/96.20 |
| 3,790,791 | 2/1974 | Anderson | 250/551 |
| 3,878,397 | 4/1975 | Robb et al. | 350/96.20 |
| 3,950,075 | 4/1976 | Cook et al. | 350/96.18 |
| 3,999,837 | 12/1976 | Bowen et al. | 350/96.22 |
| 4,118,105 | 10/1978 | Voigt | 350/96.20 |

Primary Examiner—Stewart J. Levy
Attorney, Agent, or Firm—AMP Incorporated

[57] ABSTRACT

In a packaging means for packaging together a light source or detecting means, a lens, and an optical fiber there is provided a sleeve for holding the light source/detector at one end of the sleeve and the lens at the other end to form a lens package. To hold the lens package there is provided a housing having first and second cavities opening onto each other and separated by shoulder means. The optical fiber is positioned in the first cavity with its end just short of the shoulder means. The lens package is retained in the second cavity with the lens abutted against said shoulder means with its focal axis aligned with the axis of the optical fiber and further with the tolerance error of the distance between said lens and the end of the optical fiber being determined largely by the variations in radius of said lens and variations in the position of the end of the optical fiber. The lens package can be retained in the second cavity by a matrix of flexible plastic partitions extending into the second cavity from the shoulder means in a box-like configuration which frictionally grips the lens package in an aligned position with the optical fiber.

3 Claims, 8 Drawing Figures

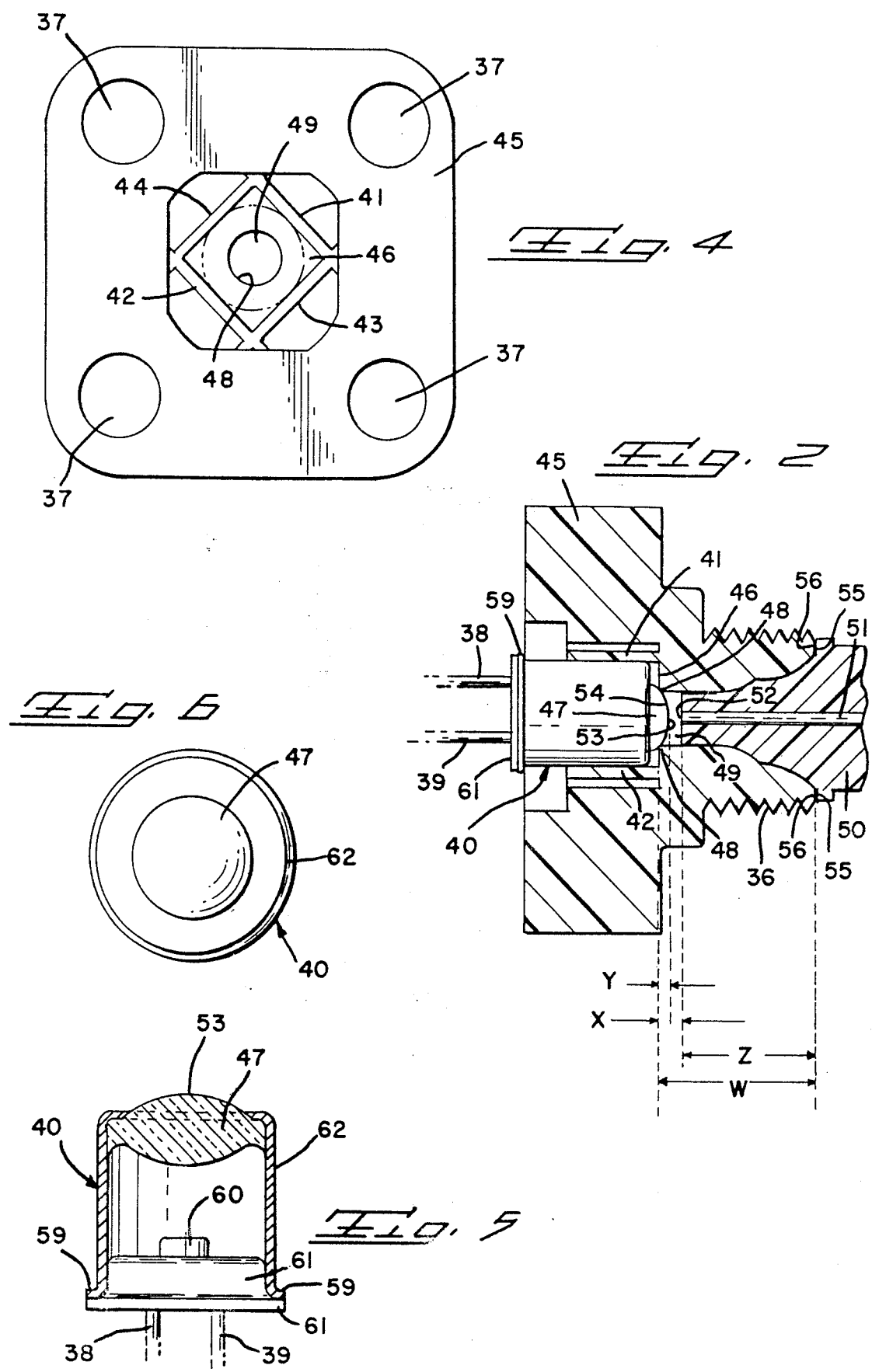

LIGHT DEVICE, LENS, AND FIBER OPTIC PACKAGE

BACKGROUND OF THE INVENTION

This invention relates generally to a structure for packaging together a light generating or detecting device, a lens and an optical fiber and more particularly to a packaging arrangement wherein light loss occurring between the lens and the optical fiber, which ordinarily is caused by an accumulation of dimension tolerances, is substantially reduced.

There are means in the art for packaging together a light device, such as an LED light source, a lens, and an optical fiber so that the light from the LED is focused through the lens onto the optical fiber or, alternatively, the light from the optical fiber is focused through the lens onto a light sensitive device. Such prior art packaging means involves the securing of the light device upon a header and then securing the header in a flange at one end of a metal sleeve with the lens being secured at the other end of the metal sleeve to form a lens package. This lens package is then secured in a first cavity in a plastic housing which also has a second cavity for retaining and securing the optical fiber.

The end of the optical fiber preferably is placed as close to the lens as possible and along the focal axis thereof so that efficient transmission of light between the lens and the optical fiber can occur. In such prior art structure, however, the position of the lens with respect to the fiber is determined by the length of the sleeve and the header dimensions since the header is secured in the flange formed at the first end of the sleeve. More specifically, the flange is secured in the plastic housing so that all tolerance errors between the flange and the end of the lens are cumulative. Such tolerance errors include not only the sleeve and header dimensions but also the shape and size of the lens. Such total cumulative error can be substantial and amount to a loss of as much as 4.0 or 4.5 decibels in the transmission of light between lens and fiber.

BRIEF STATEMENT OF THE INVENTION

It is a primary object of the invention to provide a packaging arrangement wherein the amount of tolerance between a lens and an end of an optical fiber is minimized.

It is a further object of the invention to minimize the tolerance error between a lens and an optical fiber by positioning the lens surface in an abutting position against shoulder means formed in a plastic housing between a cavity containing the end of the optical fiber and a cavity containing the lens so that the tolerance error between the lens and the optical fiber is determined solely by the radius of the lens and the position of the optical fiber in the housing.

It is a further object of the invention to provide support for a sleeve of a lens package within a housing by means of a matrix of flexible plastic partitions formed into a box-like structure into which the lens package is inserted and flexibly retained with a minimum of resultant axial misalignment of the lens package.

It is a fourth purpose of the invention to improve generally means for packaging together an optical device, a lens and an optical fiber.

In accordance with one embodiment of the invention there is provided a means for packaging together a light sensitive device, which can be either a source or a detector, a lens and a terminated optical fiber to produce a closely controlled spacing between the lens and the end of the optical fiber and also to closely control the axial alignment of the optical fiber with the focal axis of the lens to enable efficient transfer of light between the lens and the end of the optical fiber. A lens package comprises a tubular sleeve having the lens mounted at one end thereof and the light device at the other. There is further provided a housing with first and second cavities formed therein opening onto each other and separated by shoulder means. A plurality of flexible, plastic partition-like members extend upwardly from said shoulder means into the first cavity to form a box-like enclosure into which the lens package is inserted and retained. The second cavity receives and retains the terminated end of the optical fiber with said terminated end having a given position with respect to said shoulder means. The lens package is positioned within said box-like enclosure with the lens abutting against said shoulder means to limit the tolerance of dimensional error between the lens and the end of the optical fiber to variations in the radius of the lens and the position of the fiber in the said first housing cavity.

BRIEF DESCRIPTION OF THE DRAWINGS

The above and other objects and features of the invention will be more fully understood from the following detailed description thereof when read in conjunction with the drawings in which:

FIG. 2 is a longitudinal section view of a preferred embodiment of the invention;

FIG. 4 is a plan view of the plastic housing of the structure of FIGS. 2 and 3 showing in particular the configuration of the plastic partitions in the housing which form the box-like structure to hold the lens package;

FIG. 5 is a longitudinal section view of the lens package;

FIG. 6 is a top view of the structure of FIG. 5;

DETAILED DESCRIPTION OF THE INVENTION

Figure 1:
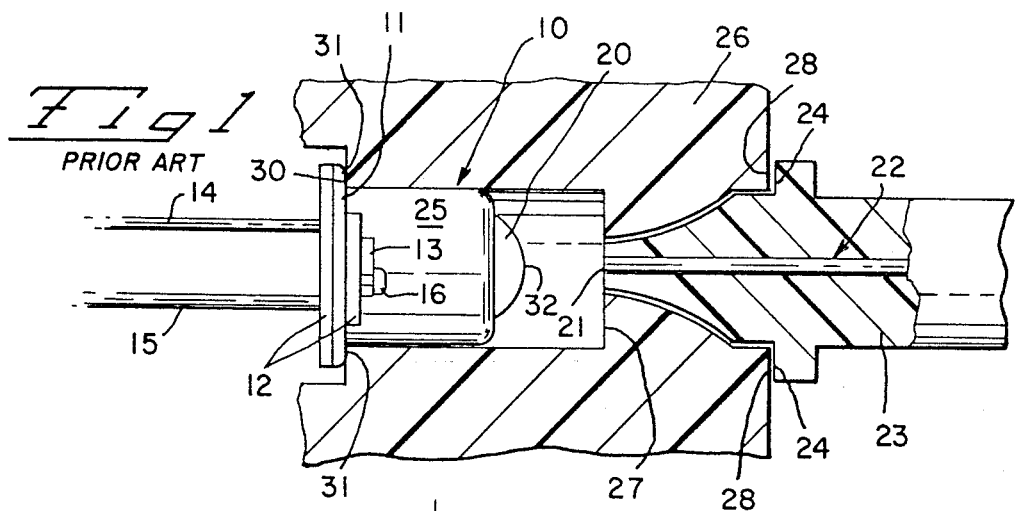
FIG. 1 is a longitudinal section view of the prior art structure.

Referring now to the prior art structure of FIG. 1 a lens package assembly 10 is comprised of a metal sleeve 25 having a flanged end 11 formed at one end thereof. Mounted on the flanged end 11 is a header 12 upon which in turn is mounted a light detector or a light source 13. For purposes of the discussion in this specification, assume that the element 13 and corresponding elements in other figures is a light source such as an LED although it could also be a light detector. A pair of input leads 14 and 15 supply power to the LED 13 with the conductor 15 being connected to one terminal of the LED through a connecting wire 16 and the other terminal 14 being directly connected to the LED 13.

At the other end of the lens package 10 a lens 20 is mounted which focuses the light from the LED 13 therethrough and onto the end 21 of an optical fiber 22. Said optical fiber 22 is retained in a ferrule 23 which has a pair of shoulders 24 formed thereon which bear against mating shoulders 28 formed in the housing 26. The housing 26 retains both the lens package assembly 10 and the ferrule 23.

The position of the shoulders 24 and 28 on the ferrule 23 and the housing 26, respectively, is such that the end 21 of the optical fiber 22 is positioned as shown in FIG. 1 substantially flush with the surface 27 within the housing 26.

It can also be seen that the shoulder 30 of the flanged end 11 abuts against a mating shoulder 31 on the housing 26 to thereby determine the relative positions of the lens package 10 and the lens 20 with the end 21 of the optical fiber 22.

However, problems exist with the prior art structure of FIG. 1 in that the tolerances are cumulative and can produce a substantial error in the resultant distance between the center 32 of the convex surface of lens 20 and the end 21 of the optical fiber 22. Such variations in the distance between the points 32 and 21 can result in losses as high as 4.5 decibels in the transmission of light between the lens 20 and the end 21 of the optical fiber 22.

Specifically, the accumulation of tolerances arise in the following manner. Firstly, the distance between the shoulders 31 and 28 of the main housing 26 can vary over several thousandths of an inch. Secondly, the actual length of the sleeve 25 of the lens package 10 can vary up to ten or more thousandths of an inch. Thirdly, the radius of the lens 20 can vary so that the position of the center 32 thereof can vary over a distance of up to seven thousandths of an inch. The overall result of the accumulation of the foregoing tolerances, mentioned above can be of a magnitude that the light loss can be of the order of 4.0–4.5 decibels.

Figure 3:
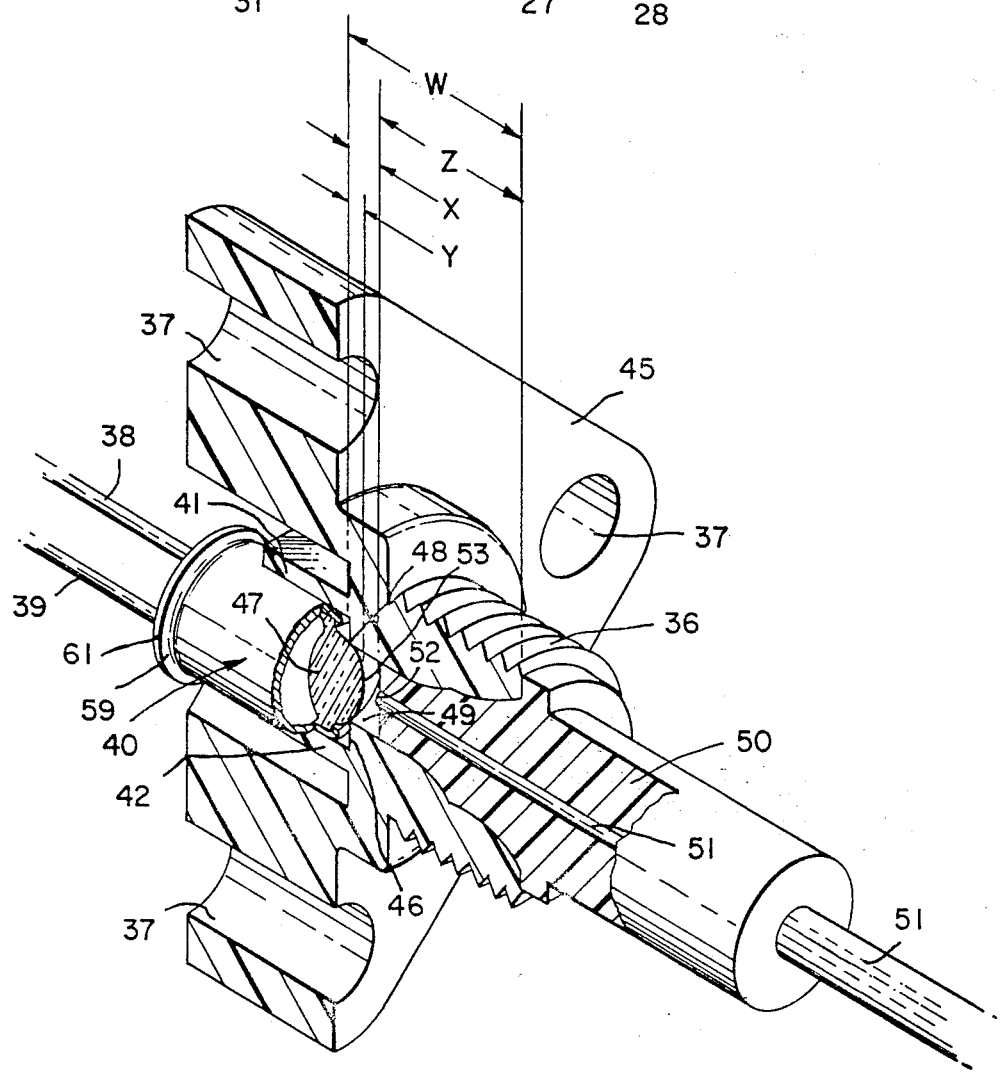
FIG. 3 is a perspective view of the structure of FIG. 2 with the portions thereof broken away.

Referring now to FIGS. 2, 3 and 4 it can be seen that the lens package 40 is retained within the four resilient plastic partitions 41, 42, 43 and 44. In FIG. 2 it can be seen that the plastic partitions 41 and 42 are integral with the housing 45 and extend upwardly from the bottom surface 46 thereof.

The lens package 40, with leads 38 and 39, is inserted into the box-like structure formed by partitions 41–44 until the lens 47 abuts against the edges 48 of the cavity 49 which retains the plastic ferrule 50 therein. Within the plastic ferrule 50 is contained the optical fiber 51 the end portion 52 of which is positioned just adjacent the center 53 of the convex surface 54 of the lens 47.

FIG. 4 clearly shows the box-like structure formed by the four flexible partitions 41 through 44 and also shows mounting holes 37 to enable mounting of the structure to a supporting panel (not shown).

As mentioned above the lens 47 is positioned against the edges 48 of the cavity 49 containing ferrule 50 so that the distance between the center 53 of the lens 47 and the end 52 of the optical fiber 51 is determined solely by the radius of the lens 47 and the position of the ferrule 50 in the cavity 49.

It is found that it is possible to position the end 52 of the optical fiber 51 from the shoulders 55 and 56 between the ferrule 50 and the housing 45 within one or two thousandths of an inch so that the total tolerance error is due primarily to the radius of the lens 47.

Summarizing the foregoing by use of the distances W, X, Y and Z indicated in FIG. 2 the distance Z can be maintained within one or two thousandths of an inch. The distance Y, which is a distance between the surface 54 of the lens and the end 52 of the optical fiber 51 can also be maintained within six or seven thousands of an inch. The variation in the distance W, i.e. the distance between the shoulders 56 and the shoulders 46 of the housing 45 can be maintained within one thousandths of an inch.

Thus, the total tolerance error between the surface 53 of the lens 47 and the end 52 of the fiber 50 ranges from zero to about ten thousandths of an inch, which is a marked improvement over prior art structures.

FIG. 3 shows a perspective view of the structure of FIG. 2 with corresponding parts being identified by similar reference characters. The threaded portion 36 is for receiving a collar (not shown) to secure the ferrule 50 onto the housing 45.

Referring now to FIG. 5 there is shown a sectional view of the lens package 40 wherein it can be clearly seen that the lens 47 is formed as a part of the sleeve 62. The light source 60 is mounted on a header 61 which in turn is mounted on flange 59 of the sleeve 62.

FIG. 6 shows a top view of FIG. 5

Figure 7:
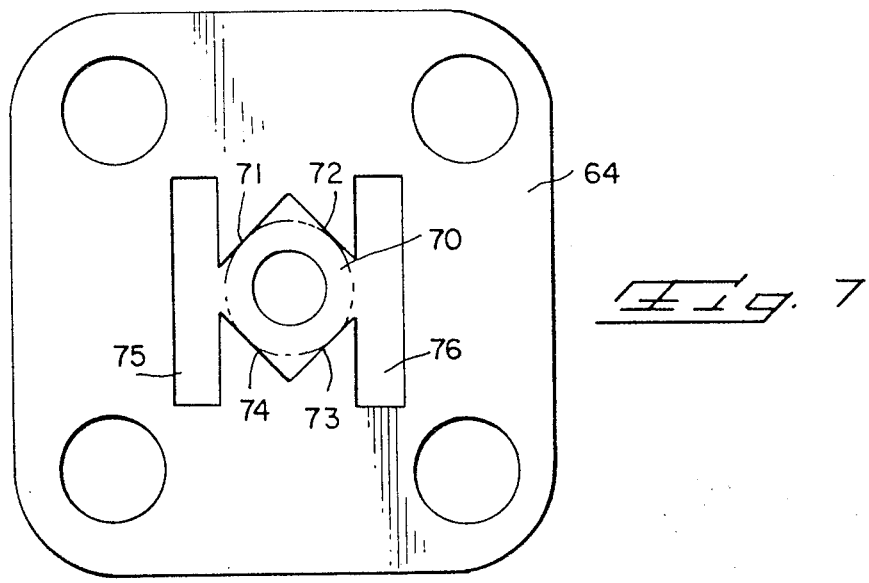
FIG. 7 is a plan view of another form of the invention showing a different support housing configuration to support the lens package herein.
Figure 8:
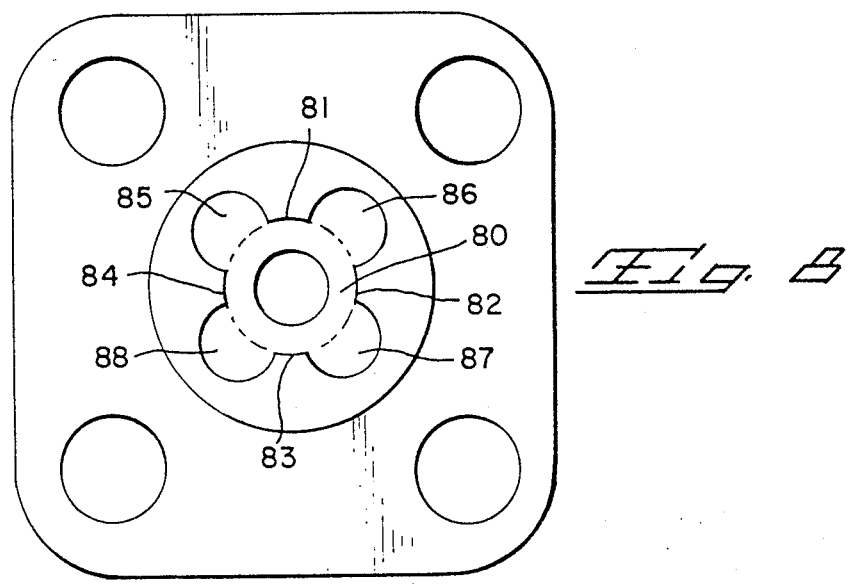
FIG. 8 is a further plan view showing still another form of the housing for retaining the lens package therein.

Referring now to FIGS. 7 and 8 there are shown alternate views or modifications of the invention. In FIG. 8, for example, the lens package 70 is held within the four walls 71, 72, 73 and 74 formed in the plastic housing 64. The cavities 75 and 76 enable the walls 71–74 to flex outwardly from the lens package 70 and into the cavity 75 and 76.

In FIG. 8 there is shown another embodiment of the invention in which the lens package 80 is secured within the surfaces 81, 82, 83 and 84. Whereas the arrangements shown in FIGS. 2 through 7 provide for resilient walls to hold the lens package, the structure of FIG. 8 employs compressive walls. More specifically, the insertion of the lens package 80 into the cavity formed by the walls 81–84 produces a compressive force onto the plastic material behind the surfaces 81–84 with some giving of the material into the cavities 85, 86, 87 and 88. The lens package is retained in the structure of FIG. 8 by virtue of said compressive force.

It is to be understood that the forms of the invention shown and described herein are but preferred embodiments thereof and that various changes can be made in proportions and configurations of the various elements without departing from the spirit or scope of the invention.

What is claimed is:

1. In an assembly for coupling a photoelectric element and an optical fiber, the improvement comprising:
    a single piece coupling body of molded insulation material having a first cavity concentrically receiving a first subassembly of a radially resilient ferrule secured concentrically over an end portion of an optical fiber,
    said body including a second cavity opening into said first cavity and receiving a second subassembly of a photoelectric element and a lens,
    said second cavity containing a plurality of partitions integrally molded with said body and constructed for frictional encirclement of said second subassembly, and
    said body having a rigid section encircling said partitions and constructed to define a clearance receiving flexure of said partitions toward and away from said rigid section.

2. The structure as recited in claim 1, wherein, said body includes a mounting flange integral with said rigid section.

3. The structure as recited in claim 1, wherein, said body includes an integral shoulder in said second cavity and engaged by said lens for locating said second subassembly.

* * * * *